(12) United States Patent
Ogura et al.

(10) Patent No.: US 9,832,362 B2
(45) Date of Patent: Nov. 28, 2017

(54) IMAGE-CAPTURING APPARATUS

(71) Applicant: Panasonic Intellectual Property Management Co., Ltd., Osaka (JP)

(72) Inventors: Motonori Ogura, Osaka (JP); Mitsuyoshi Okamoto, Osaka (JP); Shigenori Yatsuri, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/049,806

(22) Filed: Feb. 22, 2016

(65) Prior Publication Data

US 2016/0173762 A1    Jun. 16, 2016

Related U.S. Application Data

(62) Division of application No. 14/540,267, filed on Nov. 13, 2014, now Pat. No. 9,571,719.

(30) Foreign Application Priority Data

Nov. 19, 2013 (JP) .................................. 2013-238475
Oct. 27, 2014 (JP) .................................. 2014-217960

(51) Int. Cl.
*H04N 5/232* (2006.01)
*G03B 13/36* (2006.01)

(52) U.S. Cl.
CPC ..... *H04N 5/23212* (2013.01); *H04N 5/23232* (2013.01); *H04N 5/23296* (2013.01); *G03B 13/36* (2013.01)

(58) Field of Classification Search
None
See application file for complete search history.

(56) References Cited

U.S. PATENT DOCUMENTS

| 4,908,505 A | 3/1990 | Taniguchi et al. |
| 4,965,840 A | 10/1990 | Subbarao |
| 6,342,922 B1 * | 1/2002 | Mizoguchi ......... H04N 5/23212 348/342 |
| 2004/0257461 A1 | 12/2004 | Toyomura |
| 2005/0285969 A1 * | 12/2005 | Yasuda .............. H04N 5/23212 348/345 |

(Continued)

FOREIGN PATENT DOCUMENTS

| JP | 63-286811 | 11/1988 |
| JP | 1-167610 | 7/1989 |

(Continued)

*Primary Examiner* — Timothy J Henn
(74) *Attorney, Agent, or Firm* — Wenderoth, Lind & Ponack, L.L.P.

(57) ABSTRACT

An image-capturing apparatus of the present disclosure includes a focus lens, an image sensor that captures an object image formed via the focus lens and generates image data, and an image processor that calculates a value relating to an in-focus position in a state of setting resolution of an object distance according to a first moving amount of the focus lens based on (i) first image data generated by the image sensor when the focus lens is at a first position and (ii) second image data generated by the image sensor when the focus lens is moved from the first position by a first moving amount and located at a second position.

8 Claims, 8 Drawing Sheets

(56) References Cited

U.S. PATENT DOCUMENTS

| | | |
|---|---|---|
| 2008/0297648 A1 | 12/2008 | Furuki et al. |
| 2009/0074396 A1 | 3/2009 | Park et al. |
| 2010/0053417 A1 | 3/2010 | Baxansky |
| 2010/0080482 A1 | 4/2010 | Wong |
| 2011/0150447 A1 | 6/2011 | Li |
| 2011/0261251 A1* | 10/2011 | Okamoto ............... G02B 7/102 348/345 |
| 2011/0267706 A1 | 11/2011 | Karasawa |
| 2012/0057072 A1 | 3/2012 | Yamashita |
| 2013/0010077 A1 | 1/2013 | Nguyen et al. |
| 2013/0242172 A1 | 9/2013 | Hamano |
| 2014/0327812 A1 | 11/2014 | Shuda et al. |
| 2015/0109514 A1 | 4/2015 | Komatsu |

FOREIGN PATENT DOCUMENTS

| | | |
|---|---|---|
| JP | 2000-152064 | 5/2000 |
| JP | 2004-070038 | 3/2004 |
| JP | 2006-323172 | 11/2006 |
| JP | 2007-139893 | 6/2007 |
| JP | 2007-271983 | 10/2007 |
| JP | 2009-069830 | 4/2009 |
| JP | 2011-015163 | 1/2011 |
| JP | 2011-128623 | 6/2011 |
| JP | 2012-58352 | 3/2012 |
| JP | 2013-044844 | 3/2013 |
| JP | 2013-190622 | 9/2013 |
| WO | 2012/101719 | 8/2012 |
| WO | 2013/094552 | 6/2013 |

* cited by examiner

IMAGE-CAPTURING APPARATUS

TECHNICAL FIELD

The present disclosure relates to an image-capturing apparatus.

BACKGROUND ART

Japanese Patent Laid-Open Publication No. 2011-15163 discloses an image-capturing apparatus that employs a system of depth From Defocus (DFD) method. This image-capturing apparatus implements a focus control that obtains plural defocusing, and includes an image-capturing device for capturing plural images defocusing differently from each other. The image-capturing apparatus then determine an object distance based on the plural images defocusing differently from each other. The image-capturing apparatus performs the focus control based on the determined object distance.

SUMMARY

It is expected that employment of a Depth From Defocus (DFD) method increases a speed of focusing on an object. On the other hand, the employment of the DFD method requires further improvement of focus accuracy. The present disclosure provides an image-capturing apparatus for realizing a focus operation with higher accuracy.

An image-capturing apparatus of the present disclosure includes a focus lens, an image sensor that captures an object image formed via the focus lens and generates image data, and an image processor that calculates a value relating to an in-focus position in a state of setting resolution of an object distance according to a first moving amount of the focus lens based on (i) first image data generated by the image sensor when the focus lens is at a first position and (ii) second image data generated by the image sensor when the focus lens is moved from the first position by a first moving amount and located at a second position.

An image-capturing apparatus of the present disclosure includes a focus lens, an image sensor that captures an object image formed via the focus lens and generates image data, an image processor that calculates a value relating to an in-focus position based on (i) first image data generated by the image sensor when the focus lens is at a first position and (ii) second image data generated by the image sensor when the focus lens is moved from the first position by a first moving amount and located at a second position, a memory that stores a large number of point spread functions corresponding to a plurality of object distances and a controller that selects a plurality of point spread functions from the large number of point spread functions stored in the memory and supplies to the image processor. And the image processor generates a third image data by a calculation using the first image data and the selected plurality of point spread functions, and calculates the value relating to an in-focus position using the second image data and the third image data.

An image-capturing apparatus of the present disclosure includes a focus lens, an image sensor that captures an object image formed via the focus lens and generates image data, an image processor that calculates a value relating to an in-focus position based on (i) first image data generated by the image sensor when the focus lens is at a first position and (ii) second image data generated by the image sensor when the focus lens is moved from the first position by a first moving amount and located at a second position, a controller that determines a moving amount of the focus lens based on the value relating to the in-focus position and a lens driver that drives the focus lens based on the moving amount of the focus lens. And the controller determines whether the value relating to the in-focus position is within a first predetermined range, (i) when the value relating to the in-focus position is not within the first predetermined range, sets a next moving amount of the focus lens to a second moving amount is increased from the first moving amount, and (ii) when the value relating to the in-focus position is within the first predetermined range, sets a next moving amount of the focus lens to a third moving amount is decreased from the first moving amount.

The present disclosure can provide the image-capturing apparatus for realizing the focus operation with higher accuracy.

DETAIL DESCRIPTION OF PREFERRED EMBODIMENT

An exemplary embodiment of the present disclosure will be detailed below with reference to the accompanying drawings. An excessive description is omitted. For instance, a description of a well-known subject in a public domain is omitted, or a description of a similar element to that discussed previously is omitted for avoiding redundancy and facilitating an ordinary skilled person in the art to understand the present disclosure.

The inventors provide the accompanying drawings and the description for the ordinary skilled person in the art to fully understand the disclosure, so that these materials may not limit the scope of the claims.

A number of methods for measuring an object distance, a distance from an image-capturing apparatus to an object includes a depth from Defocus (DFD) method that utilizes correlation values of defocusing amounts generated in image captured with a camera. In general, a defocusing amount is uniquely determined for each image-capturing apparatus in response to a relation between a focal position and the object distance. In the DFD method utilizing the above characteristics, two images having different defocus amounts are produced, and the object distance is measured based on a point-spread function (PSF) and a difference in the defocusing amounts. The image-capturing apparatus in accordance with this embodiment measures the object distance by utilizing the DFD calculation to perform an auto-focus control.

A structure and operation of the image-capturing apparatus in accordance with the embodiment will be described below.

1. Electrical Structure of Image-Capturing Apparatus

Figure 1:
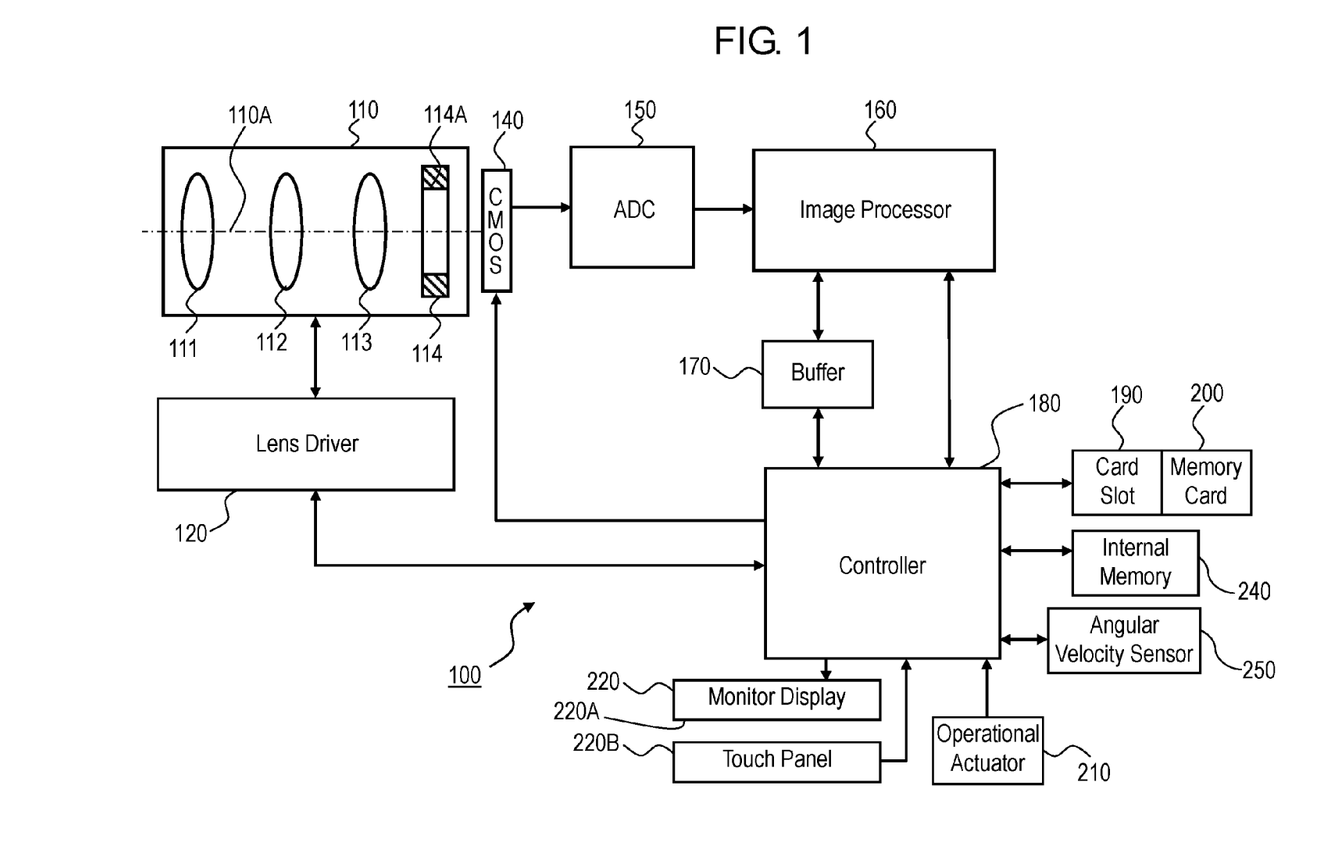
FIG. 1 is a block diagram of a digital video camera in accordance with an exemplary embodiment for illustrating an electrical structure of the digital video camera.

FIG. 1 is a block diagram of digital video camera 100, an image-capturing apparatus in accordance with the embodiment, for illustrating an electrical structure of digital video camera 100. Digital video camera 100 includes optical system 110 including at least one lens. Optical system 110 forms an object image on CMOS image sensor 140 by utilizing light from an object. The object image is captured with an image sensor, CMOS image sensor 140. CMOS image sensor 140 produces image data based on the captured object image. The image data produced by CMOS image sensor 140 is converted into a digital signal with ADC 150, and processed with image processor 160. The digital signal is stored in memory card 200. The structure of digital video camera 100 will be detailed below.

Optical system 110 in accordance with the embodiment includes zoom lens 111, camera-shake correcting lens 112, focus lens 113, and iris 114. Zoom lens 111 moves along optical axis 110X to enlarge and reduce the object image. Focus lens 113 moves along optical axis 110X to adjust a focus of the object image. Camera-shake correcting lens 112 is movable within a plane perpendicular to optical axis 110X of optical system 110. Camera-shake correcting lens 112 moves along a direction in which a shake of digital video camera 100 is cancelled as to reduce an influence caused by the shake of camera 100 on the captured image. Iris 114 has opening 114A therein disposed on optical axis 110X, and adjusts the size of opening 114A automatically or according to a user's setting, so that iris 114 can adjust an amount of light transmitting through iris 114.

Lens driver 120 includes a zoom actuator that drives zoom lens 111, a camera-shake correcting actuator that drives camera-shake correcting lens 112, a focus actuator that drives focus lens 113, and an iris actuator that drives iris 114. Lens driver 120 controls the zoom actuator, the camera-shake correcting actuator, the focus actuator, and the iris actuator.

CMOS image sensor 140 captures the object image formed by optical system 110, and produces analog image data in form of an analog signal. Image sensor 140 performs various operations, such as exposure, transfer, and electronic shutter.

A/D converter 150 converts the analog image data produced by CMOS image sensor 140 into digital image data in form of a digital signal.

Image processor 160 processes the image data produced by CMOS image sensor 140 to produce image data to be displayed on monitor display 220 and to produce image data to be stored in memory card 200. For instance, image processor 160 performs a gamma correction, a white-balance correction, and a flaw correction on the image data produced by CMOS image sensor 140. Image processor 160 compresses the image data produced by CMOS image sensor 140 by a compression method in accordance with H.264 standard or MPEG2 standard. Image processor 160 may be implemented by a DSP or a microprocessor.

Controller 180 controls entire digital video camera 100, and can be implemented by a semiconductor element. Controller 180 can be implemented by hardware, or by a combination of hardware and software. Controlled may be implemented by a microprocessor.

Buffer 170 functions as a working memory of image processor 160 and controller 180, and can be implemented by, e.g. a DRAM or a ferroelectric memory.

Card slot 190 holds memory card 200 detachably, and is mechanically or electrically connectable to memory card 200. Memory card 200 contains a flash memory or a ferroelectric memory therein, and stores data, such as an image file produced in image processor 160.

Internal memory 240 is implemented by a flash memory or a ferroelectric memory, and stores a control program that controls entire digital video camera 100. Internal memory 240 also stores point spread functions (PSFs).

Operational actuator 210 includes user interfaces, such as a cross key, an enter-button, for accepting operations by users.

Monitor display 220 has screen 220A that displays thereon an image indicated by the image data produced by CMOS image sensor 140 and an image indicated by the image data read out from memory card 200. Monitor display 220 displays various menus for setting functions of camera 100 on screen 220A. Touch panel 220B is disposed on screen 220A. Touch panel 220B is touched by a user for receiving various touch actions. An instruction entering through touch panel 220B as a touch action is supplied to controller 180 to be processed.

Angular velocity sensor 250 detects an angular velocity produced in digital video camera 100 due to a camera shake. The angular velocity detected by sensor 250 is supplied to controller 180. Controller 180 drives camera-shake correcting lens 112 to cancel a camera shake produced in digital video camera 100 due to the angular velocity.

2. Operations of Digital Video Camera 100

Figure 2:
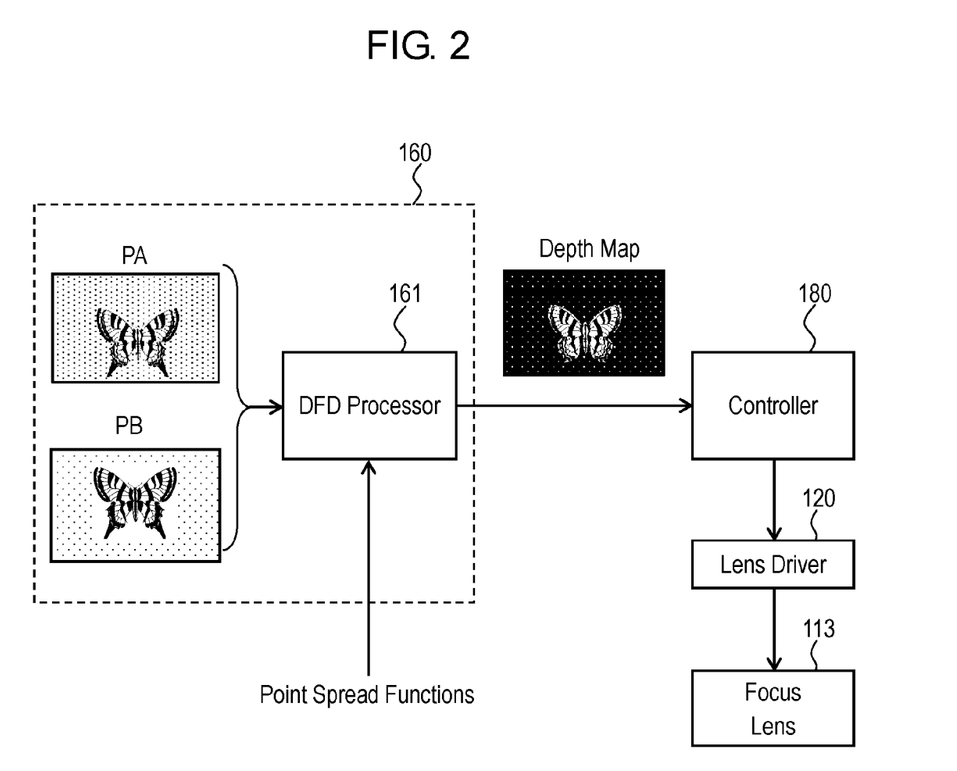
FIG. 2 is a block diagram of the digital video camera in accordance with the embodiment for illustrating an operation of the digital video camera.

Digital video camera 100 performs an auto-focus operation utilizing a result of the DFD calculation. FIG. 2 is a block diagram of digital video camera 100 for illustrating a control of the focus lens by utilizing the result of the DFD calculation.

DFD processor 161 is disposed in image processor 160, and performs the DFD calculation to produce a depth map. To be more specific, DFD processor 161 uses two images: observed image PA and reference image PB having different defocusing amounts produced intentionally by changing focal positions. DFD processor 161 produces the depth map based on observed image PA, reference image PB, and point spread functions (PSFs). The depth map indicates object distances at respective ones of pixels of observed image PA (reference image PB).

Then, DFD processor 161 supplies the depth map to controller 180. Controller 180 controls lens driver 120 as to drive focus lens 113 based on the depth map.

The DFD calculation performed by DFD processor 161 shown in FIG. 2 and the determination of the object distance by controller 180 will be detailed below.

Figure 3:
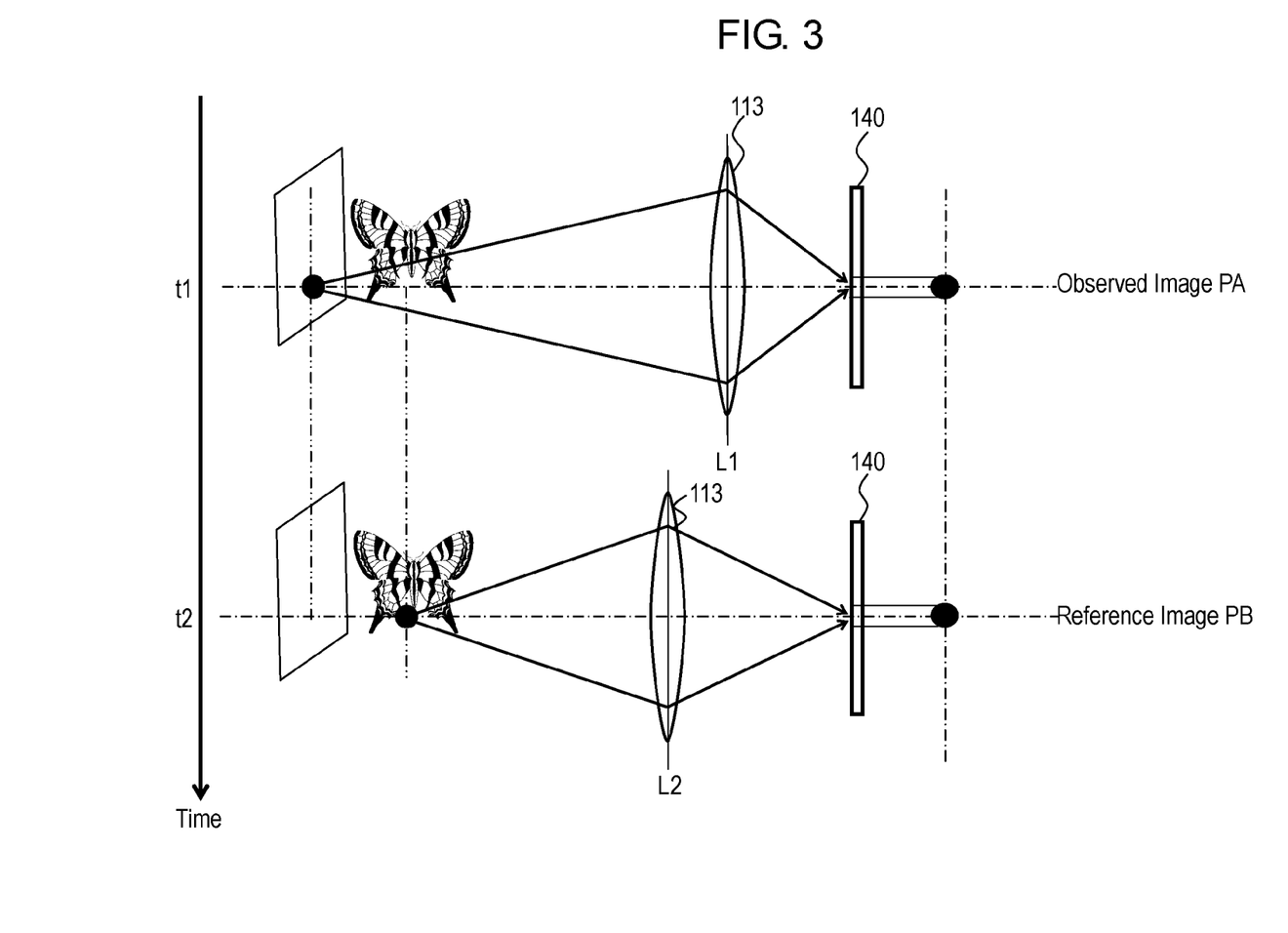
FIG. 3 is a schematic view of the operation of the digital video camera in accordance with the embodiment.

First, the DFD calculation performed by DFD processor 161 will be detailed. FIG. 3 is a schematic view of focus lens 113 of digital video camera 100 in accordance with the embodiment for illustrating the movement of focus lens 113 for the DFD calculation. Controller 180 changes a focal position based on the DFD calculation to intentionally produce two images having different defocusing amounts. To be more specific, as shown in FIG. 3, controller 180 controls lens driver 120 to locate focus lens 113 at focusing position L1 at time point t1. Similarly, focus lens 113 is located at focusing position L2 different from focusing position L1 at time point t2. CMOS image sensor 140 captures an image of the object when focus lens 113 is positioned at focusing position L1 for producing observed image PA. Similarly, image sensor 140 captures the image of the object when focus lens 113 is positioned at focusing position L2 for producing reference image PB. Although being produced by capturing the same object, images PA and PB have defocusing amounts different from each other due to different positions of focus lens 113 for the capturing.

Figure 4:
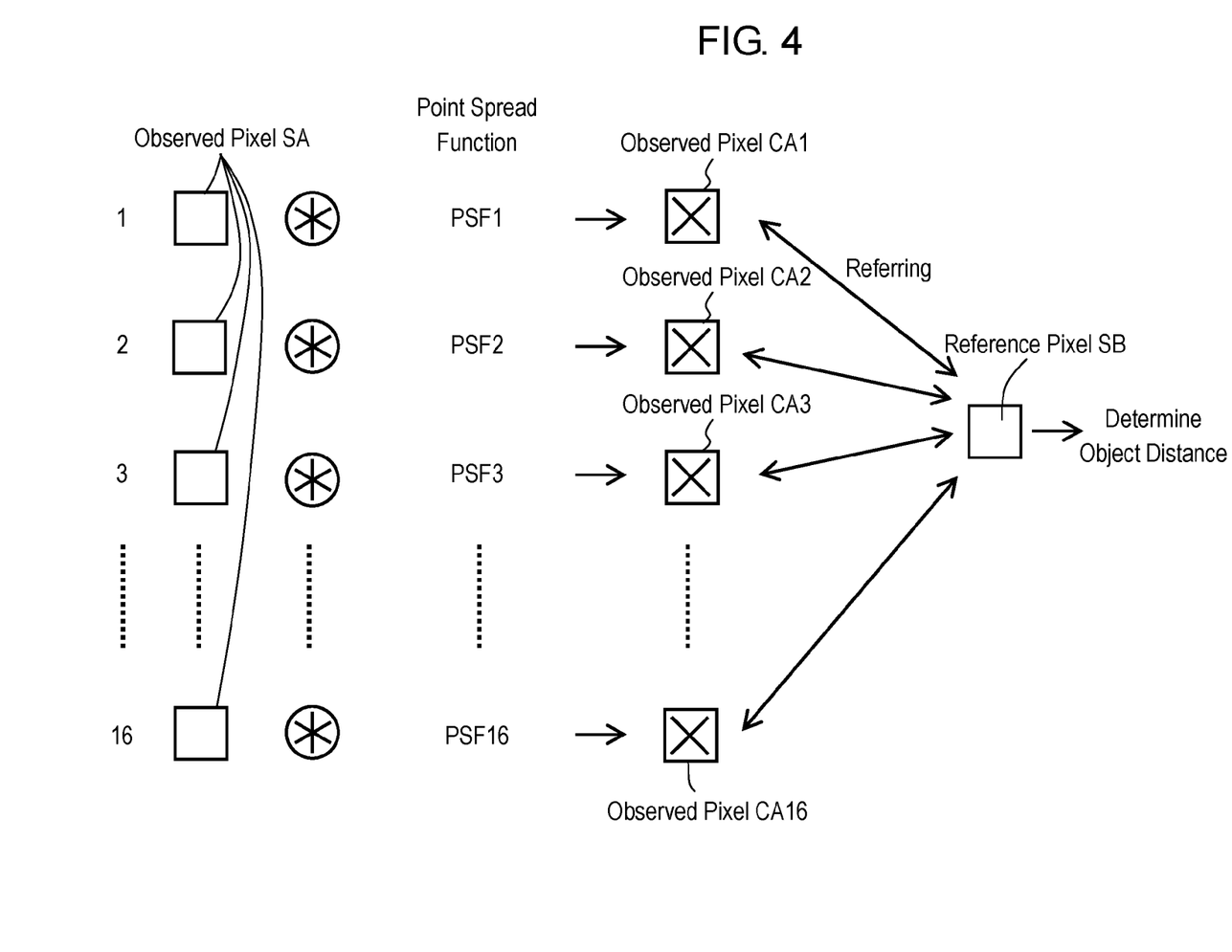
FIG. 4 is a schematic view of a DFD calculation executed by the digital video camera in accordance with the embodiment.

FIG. 4 is a schematic view for illustrating the calculation of the object distance by utilizing the DFD calculation performed by digital video camera 100 in accordance with the embodiment. DFD processor 161 performs the DFD calculation on observed pixels SA constituting observed image PA and reference pixels SB constituting reference image PB to determine the distances from respective ones of pixels SA (SB). DFD processor 161 produces plural observed pixels CA by convolutions of plural PSFs with observed pixels SA. DFD processor 161 compares plural observed pixels CA with reference pixels SB located at the same coordinates as pixels CA on the image. The above operation will be detailed below.

A point spread function (PSF) indicates a response to a point light source of an optical system, and indicates a change in a defocusing amount. A convolution of the PSF with an image corresponding to a combination of point light sources can intentionally produce a defocused image. According to the embodiment, a large number of point spread functions corresponding to a large number of distances to an object are previously provided in internal memory 240. Controller 180 separates distances to an object into sixteen steps, namely from the closest point to the farthest point, and selects sixteen point spread functions PSF1 to PSF16 corresponding to the sixteen steps out of the large number of point spread functions stored in memory 240. At this time, a resolution of the object distance is changed on 16 scales of a close side to a far side according to the moving amount of focus lens 113. That is to say, controller 180 gradually narrows a gap of the object distance that is divided into 16 scales of the close side to the far side as the moving amount of focus lens 113 decreases. On the other hand, controller 180 gradually widens the gap of the object distance that is divided into 16 scales of the close side to the far side as the moving amount of focus lens 113 increases. Controller 180 then supplies selected point spread functions PSF1 to PSF16 to DFD processor 161.

DFD processor 161 performs convolutions of point spread functions PSF1 to PSF16 with observed pixels SA as to produce sixteen observed pixels CA1 to CA16 corresponding to the object distances at respective ones of observed pixel SA. Since observed pixels CA1 to CA16 have point spread functions different from each other for convolution, observed pixels CA1 to CA16 form different defocused images.

DFD processor 161 then compares observed pixels CA1 to CA16 with reference pixel SB, and selects observed pixel CAn that has the smallest difference from reference pixel SB among observed pixels CA1 to CA16. DFD processor 161 determines the object distance corresponding to the point spread function for convolution producing observed pixel CAn as the distance to the object at observed pixel SA. For instance, if the difference between observed pixel CA3 and reference pixel SB is smaller than differences between reference pixel SB and each of other observed pixels CA1 to CA2, CA4 to CA16, then, DFD processor 161 determines that an object distance corresponding to point spread function PSF3 for convolution with observed pixel SA to produce observed pixel CA3 is the object distance at observed pixel SA. DFD processor 161 outputs distance data corresponding to the determined object distance.

DFD processor 161 performs the above operation on each observed image PA and reference image PB as to produce a depth map plotting respective object distances at the pixels. According to the embodiment, since sixteen point spread functions corresponding to distances to the object are used, the depth map exhibits sixteens levels of the object distances.

Figure 5:
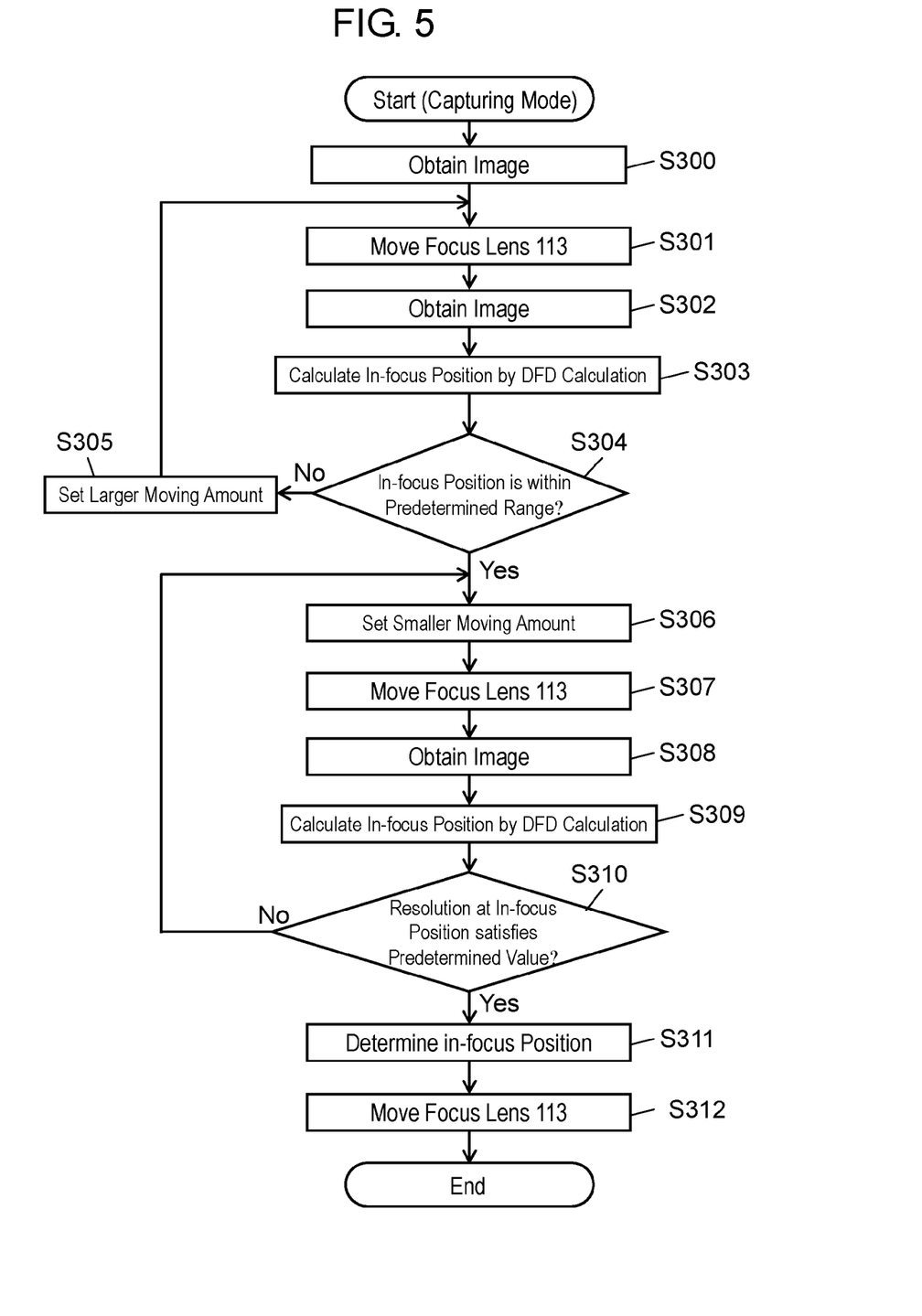
FIG. 5 is a schematic view of an autofocus operation in the digital video camera in accordance with the embodiment.
Figure 6:
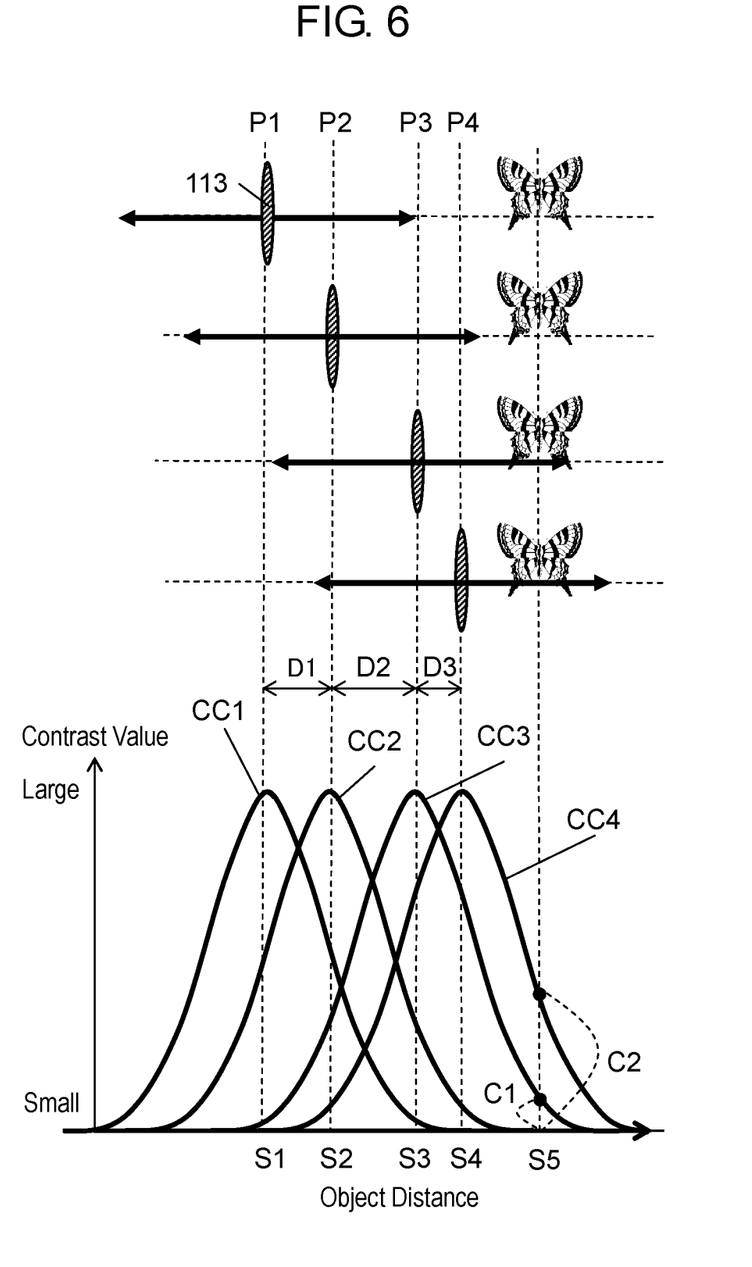
FIG. 6 is a schematic view describing the autofocus operation in the digital video camera in accordance with the embodiment.

Thereafter, an autofocus operation using a DFD calculation result is described with reference to FIG. 5 and FIG. 6. FIG. 5 is a flowchart illustrating the autofocus operation in digital video camera 100. FIG. 6 is an image diagram describing the autofocus operation in digital video camera 100. FIG. 6 illustrates an image of a contrast value with respect to the object distance at respective positions P1 to P4 of focus lens 113. In FIG. 6, positions P1 to P4 indicate positions of focus lens 113. Moving amounts D1 to D3 indicate moving amounts of focus lens 113. Further, object distances S1 to S5 indicate distances to an object. Further, contrast curves CC1 to CC4 are contrast curves in which contrast values obtain a peak when focus lens 113 is at positions P1 to P4 on object distance S1 to S4. Object distance S5 indicates the object distance where an object that is subject to the focus operation is present.

As shown in FIG. 5, digital video camera 100 performs an autofocus operation in a capturing mode. Image processor 160 obtains an image captured by CMOS image sensor 140 at current position P1 of focus lens 113 (step S300). Controller 180 then controls lens driver 120 to move focus lens 113 from position P1 by first moving amount D1 to position P2 which is shifted (step S301). When focus lens 113 moves to position P2, image processor 160 obtains the image captured by CMOS image sensor 140 (step S302).

Image processor 160 uses the image obtained in step S300 as observed image PA and the image obtained in step S302 as reference image PB so as to perform the DFD calculation described above (step S303). Image processor 160 calculates an object distance (information representing an in-focus position) according to the DFD calculation.

Controller 180 determines whether the object distance (the information representing the in-focus position) calculated in step S303 by the DFD calculation is within a predetermined range (step S304). At this time, the determination is that the object distance (the information representing the in-focus position) calculated by the DFD calculation in step S303 is which object distance corresponding to 16 point spread functions PSF1 to PSF16. Point spread functions PSF1 to PSF16 correspond to the object distances divided into 16 scales of the close side to the far side. At this time, point spread function PSF1 corresponds to the object distance on the closest side in point spread functions PSF1 to PSF16. On the other hand, point spread function PSF16 corresponds to the object distance on the farthest side in point spread functions PSF1 to PSF16. Therefore, concretely controller 180 determines whether the object distance (the information representing the in-focus position) calculated by the DFD calculation in step S303 corresponds to point spread function PSF1 or point spread function PSF16 (out of the predetermined range), or corresponds to point spread functions PSF2 to PSF15 (within the predetermined range).

When the determination is that the object distance calculated by the DFD calculation in step S303 (the information representing the in-focus position) is not within the predetermined range (corresponding to point spread function PSF1 or point spread function PSF16) ("No" in step S304), controller 180 sets second moving amount D2 that is larger than the first moving amount D1 as the moving amount of focus lens 113 in the DFD calculation (step S305). Controller 180 controls lens driver 120 so as to move focus lens 113 to position P3 shifted from position P2 by the second moving amount D2 (a second round of step S301). When focus lens 113 moves to position P3, image processor 160 obtains an image captured by CMOS image sensor 140 (a second round of step S302).

Image processor 160 uses the image obtained in the first round of step S302 as observed image PA and the image obtained in the second round of step S302 as reference image PB, so as to again perform the DFD calculation (a second round of step S303). Image processor 160 calculates the object distance (the information representing the in-focus position) according to the DFD calculation. Controller 180 again determines whether the object distance calculated by the DFD calculation in step S303 (the information representing the in-focus position) is within the predetermined range (a second round of step S304). Controller 180 repeats the operation in step S301 to step S305 until the object distance calculated by the DFD calculation in step S303 (the information representing the in-focus position) is within the predetermined range (corresponding to point spread functions PSF2 to PSF15). Technical significance that increases the moving amount of focus lens 113 when the object distance calculated by the DFD calculation in step S303 is not within the predetermined range is described later.

When the determination is in step S304 that the object distance calculated by the DFD calculation in step S303 (the information representing the in-focus position) is within the predetermined range ("Yes" in step S304), controller 180 sets third moving amount D3 that is reduced to be smaller than the previous moving amount (the first moving amount D1 or the second moving amount D2) as the moving amount of focus lens 113 in the DFD calculation (step S306). Controller 180 then controls lens driver 120 so as to move focus lens 113 to position P4 shifted from position P3 by the third moving amount D3 (step S307). When focus lens 113 moves to position P4, image processor 160 obtains an image captured by CMOS image sensor 140 (step S308).

Image processor 160 uses the image obtained in previous step S302 as observed image PA and the image obtained in step S308 as reference image PB so as to perform the DFD calculation (step S309). Image processor 160 calculates an object distance (information representing an in-focus position) according to the DFD calculation.

Controller 180 then determines whether the object distance (the information representing the in-focus position) calculated by the DFD calculation satisfies a predetermined resolution (step S310). In the exemplary embodiment, a resolution that does not provide feelings of defocusing on an image is determined as the predetermined resolution.

When the object distance (the information representing the in-focus position) calculated by the DFD calculation does not satisfy the predetermined resolution ("No" in step S310), controller 180 again makes image processor 160 perform the DFD calculation. At this time, controller 180 sets a moving amount that is reduced further than the third moving amount D3 as the moving amount of focus lens 113 in the DFD calculation (a second round of step S306). Controller 180 repeats the processes in step S306 to step S310 until the object distance (the information representing the in-focus position) calculated by the DFD calculation in step S309 satisfies the predetermined resolution ("Yes" in step S310). Technical significance that reduces the moving amount of focus lens 113 when the object distance (the information representing the in-focus position) calculated by the DFD calculation in step S309 is the predetermined resolution or less is described later.

Figure 7:
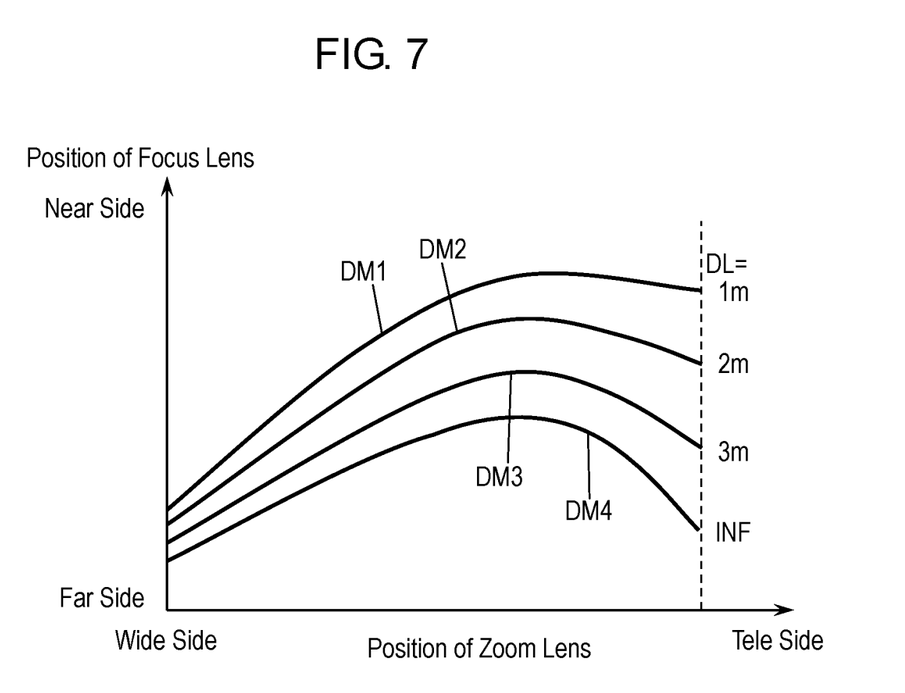
FIG. 7 is a zoom tracking table with respect to distances to plural object distances of the digital video camera in accordance with the embodiment.

When the determination is in step S310 that the object distance (the information representing the in-focus position) calculated by the DFD calculation in step S309 satisfies the predetermined resolution ("Yes" in step S310), controller 180 determines an in-focus position to which focus lens 113 should be finally moved based on the object distance determined by the DFD calculation in the autofocus operation (step S311). To be more specific, controller 180 refers to a tracking table for calculating the in-focus position based on the determined object distance as well as a current position of focus lens 111. FIG. 7 is the zoom tracking table for plural object distances of digital video camera 100 in accordance with the embodiment. As shown in FIG. 7, profiles DM1 to DM4 indicate in-focus positions corresponding to a position of zoom lens 111 for typical distances DL to an object (1m, 2m, 3m, and infinite shown in FIG. 7). Controller 180 can calculate in-focus positions for object distances other than the typical object distances DL by interpolation to the profiles shown in FIG. 7 with respect to the object distances.

Controller 180 controls lens driver 120 so as to move focus lens 113 to the in-focus position (step S312).

The above-described autofocus operation enables digital video camera 100 to secure focus accuracy.

Technical significance that increase the moving amount of focus lens 113 when the object distance calculated by the DFD calculation in step S303 (the information representing the in-focus position) is not within the predetermined range (corresponding to point spread function PSF1 or point spread function PSF16) is described below.

FIG. 6 illustrates a relationship of the contrast value with respect to the object distances when focus lens 113 is at positions P1 to P4. The object distance is calculated based on at least two images obtained on different focus lens positions, respectively, in the DFD calculation. Concretely, image processor 160 compares observed image CA, which is a result of convolving the point spread function with observed pixel SA of observed image PA, with reference pixel SB of reference image PB so as to calculate the object distance. In order to calculate a significant object distance in this comparison, reference image PB should have a contrast value that is a predetermined value or more on a target object distance. A case where reference image PB does not have the contrast value that is the predetermined value or more on the target object distance means that a contrast value of an object image positioned on a target object distance cannot be significantly detected on reference image PB. For this reason, focus lens 113 should be further moved to a position where the contrast image of the object image positioned on the target object distance can be significantly detected. In an example shown in FIG. 6, a target object is present on object distance S5. At this time, since the contrast value on object distance S5 of contrast curve CC2 having two peaks on object distance S2 is very small, a significant contrast value cannot be detected on object distance S5 from contrast curve CC2. That is to say, when focus lens 113 is at position P2, a significant contrast value cannot be detected for an object on object distance S5. At this time, focus lens 113 may be moved by first moving amount D1 that is the same as the amount at the previous time (step S301) without increasing the moving amount in step S305 in FIG. 5. However, when focus lens 113 is moved by second moving amount D2 that is larger than first moving amount D1, a possibility that a contrast value of an object image positioned on a target object distance can be significantly detected can be heightened. As shown in FIG. 6, when focus lens 113 is moved to position P3 by the second moving amount D2 that is larger than the first moving amount D1, significant contrast value C1 can be detected on object distance S5. That is to say, contrast curve CC3 having a peak on object distance S3 has significant contrast value C1 on object distance S5.

Technical significance that reduces the moving amount of focus lens 113 when the object distance (the information representing the in-focus position) calculated by the DFD calculation in step S309 is lower than the predetermined resolution is described below.

Figure 8:
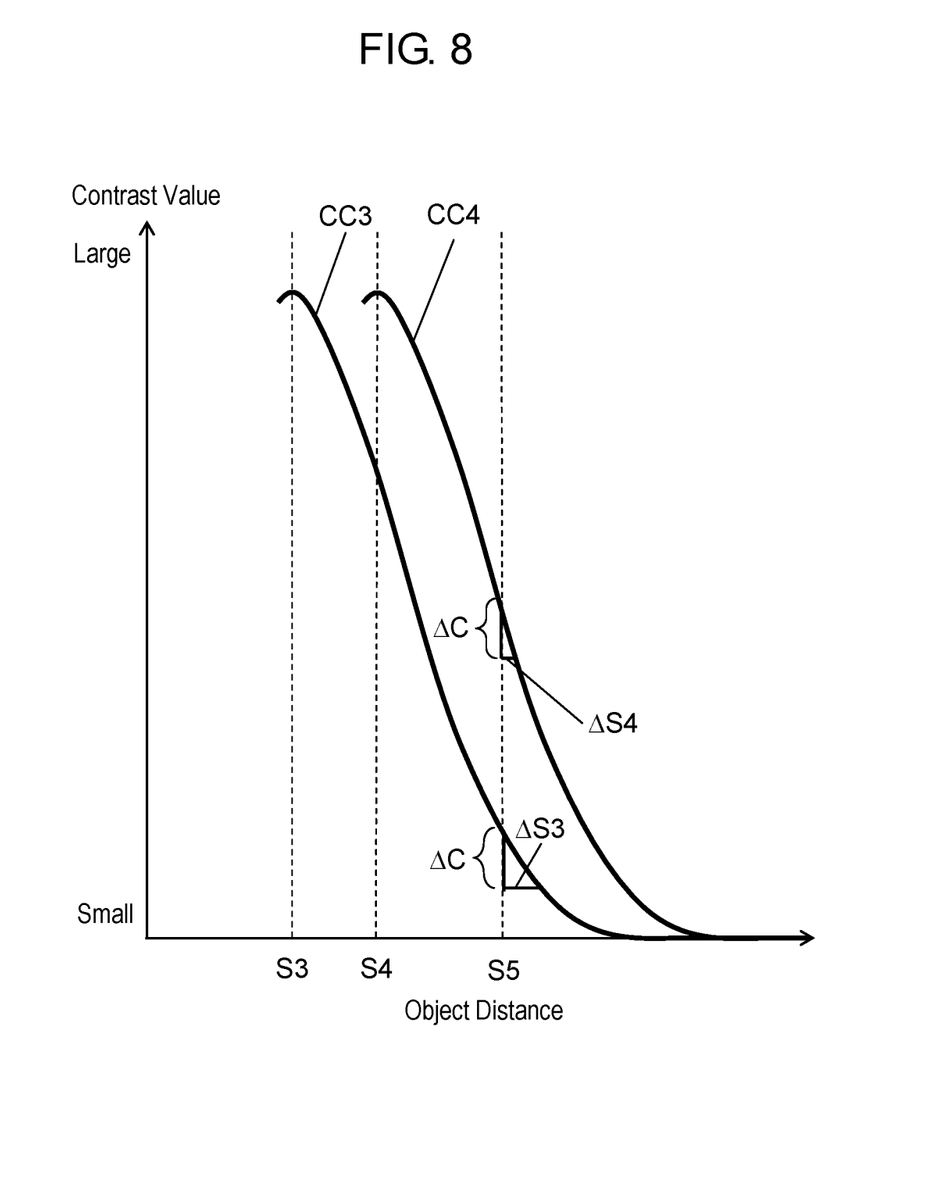
FIG. 8 is an image diagram describing accuracy of DFD calculation in the digital video camera according to the exemplary embodiment.

To reduce the moving amount of focus lens 113 means to make reference image PB be closer to observed image PA. In the DFD calculation, even when a slight range where a contrast value represented by observed image PA and a contrast value represented by reference image PB overlap with each other is present, a certain comparison result can be obtained. Accuracy of the comparison of observed image PA with reference image PB is described with reference to FIG. 8. FIG. 8 is an image diagram for describing the accuracy of the DFD calculation. As shown by contrast curves CC3 and CC4 in FIG. 8, a slope is steeper as approaching from a base portion to a peak position, but the slope is gentle around the base portion. For this reason, even when the range where the contrast value shown by observed image PA and the contrast value shown by reference image PB overlap with each other is present and the overlapped range is around the base portion, a difference of the object distance with respect to a predetermined difference $\Delta C$ of the contrast value (for example, a difference $\Delta S3$ of the object distance with respect to the predetermined difference $\Delta C$ of the contrast value on object distance S5 of contrast curve CC3) becomes large, and sufficient detection accuracy of the object distance cannot be secured. On the other hand, when the overlapped region further approaches the peak position with respect to the base portion, a difference of the object distance with respect to the predetermined difference $\Delta C$ of the contrast value (for example, a difference $\Delta S4$ of the object distance with respect to the predetermined difference $\Delta C$ of the contrast value on object distance S5 of contrast curve CC4) can be reduced, and the sufficient detection accuracy of the object distance can be secured.

At a stage of reducing the moving amount of focus lens 113 in step S306 shown in FIG. 5, the object distance (the information representing the in-focus position) calculated by the DFD calculation is already within the predetermined range (corresponding to point spread functions PSF2 to PSF15) in step S304. As shown by the contrast value C1 on object distance S5 of contrast curve CC3 shown in FIG. 6, the contrast value with respect to a target object on reference image PB (observed image PA on the DFD calculation in step S309) obtained in step S302 is comparatively closer not to the base portion but to the peak position. Therefore, like contrast curve CC4 shown in FIG. 5 and FIG. 6, the contrast value on reference image PB obtained in step S308 with respect to the target object is made to be closer to the peak position, so that the detection accuracy of the object distance can be heightened in the DFD calculation in step S309. Since observed image PA at time of the DFD calculation in step S309 is already not on the base portion but on the peak position, the moving amount of focus lens 113 is reduced so that the contrast value of the target object on reference image PB can be gradually made to be closer to the peak position. In the example shown in FIG. 6, focus lens 113 is moved to position P4 by smaller third moving amount D3, so that significant contrast value C2 can be detected on object distance S5. As a result, accuracy of the focus operation based on the DFD calculation result can be improved.

3. Effects

Digital video camera 100 includes focus lens 113, CMOS image sensor 140 for capturing an object image generated via focus lens 113 and generating image data, and controller 180 for calculating a value relating to an in-focus position based on the first image data (observed image PA) generated by CMOS image sensor 140 when focus lens 113 is on the first position and the second image data (reference image PB) generated by CMOS image sensor 140 when focus lens 113 is moved from the first position by the first moving amount and located at the second position, and changing a next moving amount of focus lens 113 from the first moving amount based on a result of calculating the value relating to the in-focus position. As a result, accuracy of the calculated value relating to the in-focus position can be heightened.

In general, in an autofocus method such as a contrast autofocus method, only a high frequency component of a captured image at a certain focus lens position is extracted, and thus the in-focus position is not obtained. On the other hand, in the autofocus method using the DFD calculation, the result of the in-focus position is calculated in advance corresponding to the object distance. In digital video camera 100 of the present disclosure, the in-focus position is already calculated by using the DFD calculation, but the moving amount of focus lens 113 is changed so that the accuracy of the in-focus position calculation result can be further heightened.

Further, controller 180 determines whether the value relating to the in-focus position is within the predetermined range. When controller 180 determines that the value relating to the in-focus position is not within the predetermined range, it changes the next moving amount of focus lens 113 from the first moving amount to the second moving amount, and again calculates the value relating to the in-focus position. As a result, the focus operation can be performed more securely so that the value relating to the in-focus position falls within the predetermined range.

On the other hand, when controller 180 determines that the value relating to the in-focus position is within the predetermined range, it reduces a next moving amount of focus lens 113 from the first moving amount to a third moving amount, and again calculates the value relating to the in-focus position. As a result, the accuracy of the value relating to the in-focus position that already falls within the predetermined range can be heightened.

When controller 180 determines that the value relating to the in-focus position that is again calculated is within a predetermined second range (satisfies the predetermined resolution), it moves focus lens 113 to the calculated in-focus position. As a result, the accurate focus operation can be realized.

4. Other Embodiments

In the above embodiment, an example of a technique disclosed in this patent application is described; however, the technique disclosed in this application is not limited to the above embodiment and is applicable to other embodiments with a change, replacement, supplement, or omission. The structural elements described in the embodiment can be combined for establishing a new embodiment.

According to the above embodiment, the point spread functions are stored in internal memory 240; however, the present disclosure is not limited to this structure, for instance, the point spread functions may be stored in a memory of image processor 160. Digital video camera 100 in accordance with the above embodiment selects sixteen point spread functions; however, the number of the selected point spread functions may be larger than sixteen or smaller than sixteen in response to the number of levels of the depth map.

The digital video camera that is the image-capturing apparatus according to the exemplary embodiment is a non-interchangeable lens digital video camera, but the digital video camera is not limited to this, and thus may be an interchangeable lens digital video camera.

In the above exemplary embodiment, results of convolving point spread functions PSF1 to PSF16 with observed pixel SA are compared with reference pixel SB, but the present disclosure is not limited to this. An omnifocal image that is focused with large depth is once generated from observed pixel SA and reference pixel SB, and results of convolving point spread functions PSF1 to PSF16 with the omnifocal image may be compared with reference pixel SB. Since an omnifocal image is focused with a large depth, the omnifocal image has contrast information with large depth, and thus S/N of the DFD calculation can be improved. For this reason, calculation accuracy of an in-focus position can be further improved. Further, the results of convolving point spread function PSF1 to PSF16 with this omnifocal image may be compared with not reference pixel SB but observed pixel SA. Since the position of the focus lens differs in observed pixel SA and reference pixel SB, different contrast information of the object is provided. For this reason, even when an object has contrast information on observed pixel SA, the object might not have contrast information on reference pixel SB. In such a case, the results of convolving the point spread functions PSF1 to PSF16 with this omnifocal image are compared with observed pixel SA, so that a dynamic range in which the in-focus position can be determined by DFD calculation can be widened.

In the above embodiment, examples of the technique disclosed in the present disclosure are described with accompanying drawings and detailed descriptions. The structural elements in the drawings or the detailed descriptions include not only elements essential for problems to be solved but also other elements necessary for detailing the examples but not necessary for solving the problems. Although these elements not necessary for solving the problems are described here, they should not be construed as essential elements for the problems to be solved.

The above embodiments only describe examples of the technique disclosed in the present disclosure, so that various changes, replacements, supplements, or omissions are allowed in the scope of claims described later or an equivalent scope thereto.

The image-capturing apparatus of the present disclosure is applicable to digital video cameras, digital still cameras, portable-phones with camera function, or smart-phones with camera function.

What is claimed is:

1. An image-capturing apparatus comprising:
   a focus lens;
   an image sensor that captures an object image formed via the focus lens and generates image data;
   an image processor that calculates a value relating to an in-focus position using (i) first image data generated by the image sensor when the focus lens is at a first position, (ii) second image data generated by the image sensor when the focus lens is moved from the first position by a first moving amount and located at a second position, and (iii) resolution of an object distance according to the first moving amount of the focus lens, wherein the image processor calculates the value by comparing the second image data with a result obtained from a calculation including the first image data and distance data associated with the resolution; and
   a controller that controls the focus lens based on the calculated value.

2. The image-capturing apparatus according to claim 1, wherein the controller changes a next moving amount of the focus lens from the first moving amount based on a calculated result of the value relating to the in-focus position.

3. The image-capturing apparatus according to claim 1, wherein the controller sets the resolution of the object distance according to a division of the object distance of a near side to a far side into a plurality of scales.

4. The image-capturing apparatus according to claim 3, wherein the controller determines if the resolution is equal to or less than a predetermined resolution, and, if the resolution is determined by the controller to be equal to or less than the predetermined resolution, the controller decreases the first moving amount of the focus lens until the resolution is determined by the controller to be higher than the predetermined resolution.

5. An image-capturing apparatus comprising:
   a focus lens;
   an image sensor that captures an object image formed via the focus lens and generates image data;
   an image processor that calculates a value relating to an in-focus position using (i) first image data generated by the image sensor when the focus lens is at a first position, (ii) second image data generated by the image sensor when the focus lens is moved from the first position by a first moving amount and located at a second position, (iii) third image data generated from the first image data and the second image data, and (iv) resolution of an object distance according to the first moving amount of the focus lens, wherein the image processor calculates the value by comparing:
   a) the first image data with a result obtained from a calculation including the third image data and distance data associated with the resolution; or
   b) the second image data with the result obtained from the calculation including the third image data and the distance data associated with the resolution; and
   a controller that controls the focus lens based on the calculated value.

6. The image-capturing apparatus according to claim 5, wherein the controller changes a next moving amount of the focus lens from the first moving amount based on a calculated result of the value relating to the in-focus position.

7. The image-capturing apparatus according to claim 5, wherein the controller sets the resolution of the object distance according to a division of the object distance of a near side to a far side into a plurality of scales.

8. The image-capturing apparatus according to claim 7, wherein the controller determines if the resolution is equal to or less than a predetermined resolution, and, if the resolution is determined by the controller to be equal to or less than the predetermined resolution, the controller decreases the first moving amount of the focus lens until the resolution is determined by the controller to be higher than the predetermined resolution.

\* \* \* \* \*